Dec. 25, 1923.

E. B. CROCKER 1,478,781

TEST GAUGE PUMP

Filed Aug. 20, 1919

INVENTOR
Ernest B. Crocker
BY
Samuel E. Darby
his ATTORNEY

Dec. 25, 1923.  
E. B. CROCKER  
TEST GAUGE PUMP  
Filed Aug. 20, 1919  
1,478,781  
2 Sheets-Sheet 2
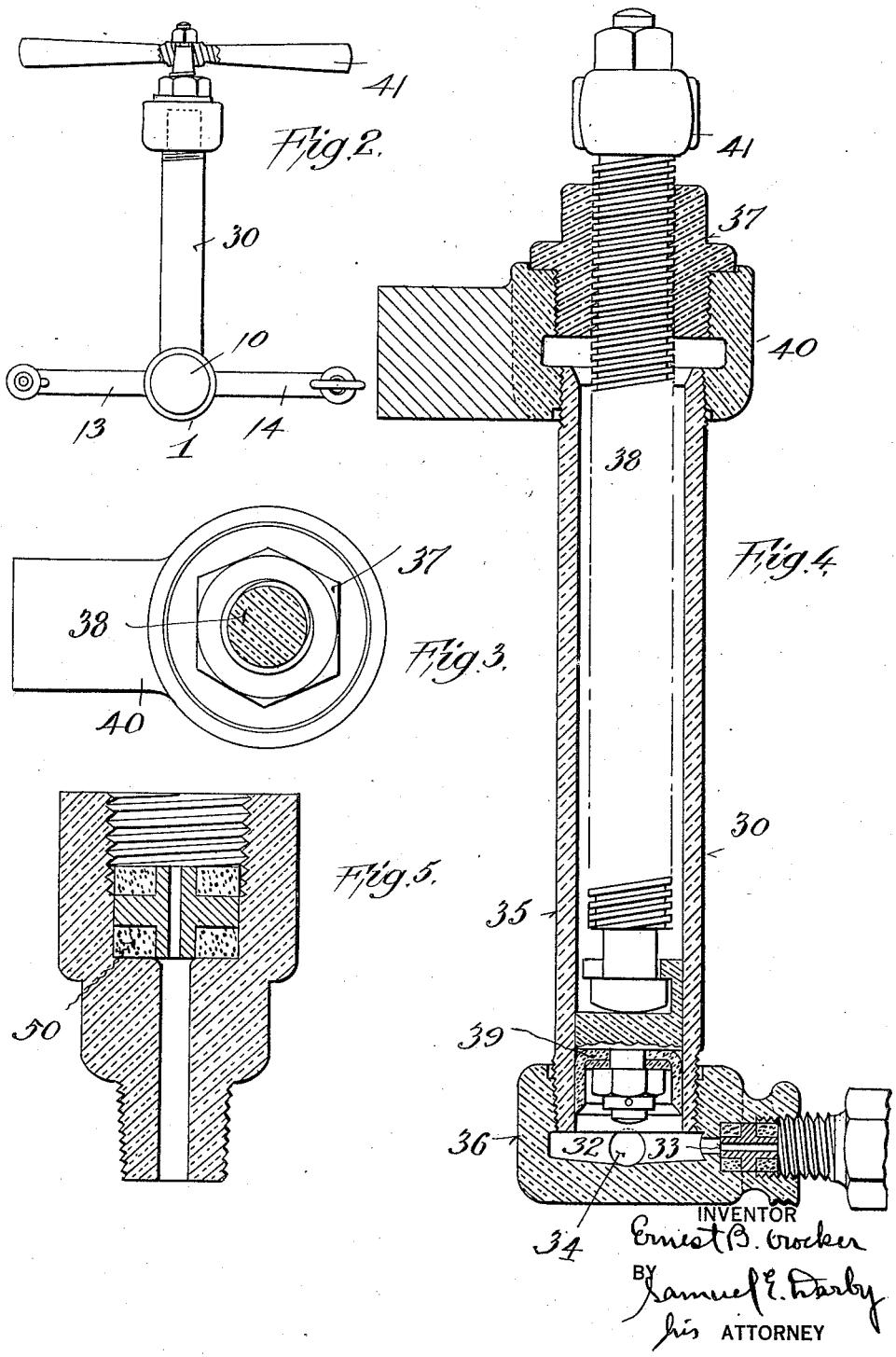

Patented Dec. 25, 1923.

1,478,781

UNITED STATES PATENT OFFICE.

ERNEST B. CROCKER, OF STRATFORD, CONNECTICUT, ASSIGNOR TO MANNING, MAXWELL & MOORE INC., OF NEW YORK, N. Y., A CORPORATION OF NEW JERSEY.

TEST GAUGE PUMP.

Application filed August 20, 1919. Serial No. 318,742.

*To all whom it may concern:*

Be it known that I, ERNEST B. CROCKER, a citizen of the United States, residing at Stratford, county of Fairfield, State of Connecticut, have made a certain new and useful Invention in Test Gauge Pumps, of which the following is a specification.

This invention relates to testing apparatus for testing gauges and the like.

The object of the invention is to provide a testing apparatus for testing gauges by means of a pump or similar means which is simple in structure, efficient in operation and economical to manufacture.

A further object of the invention is to provide a device of the character described which is compact, readily assembled and disassembled to facilitate transportation from place to place.

A further object of the invention is to provide a device of the character set forth which may be readily set up in any desired position for immediate use.

Further objects of the invention will appear more fully hereinafter.

The invention consists substantially in the construction, combination, location, and relative arrangement of parts, all as will be more fully hereinafter set forth, as shown in the accompanying drawings, and finally pointed out in the appended claims.

Referring to the drawings,—

Fig. 2 is a top plan view of the same on a reduced scale.

Fig. 3 is a plan view of the pump cylinder with the plunger removed.

Fig. 4 is a sectional view of the pump employed in accordance with my invention.

Fig. 5 is a similar view of an adapter employed in accordance with my invention.

The same part is designated by the same reference character wherever it occurs throughout the several views.

Figure 1:
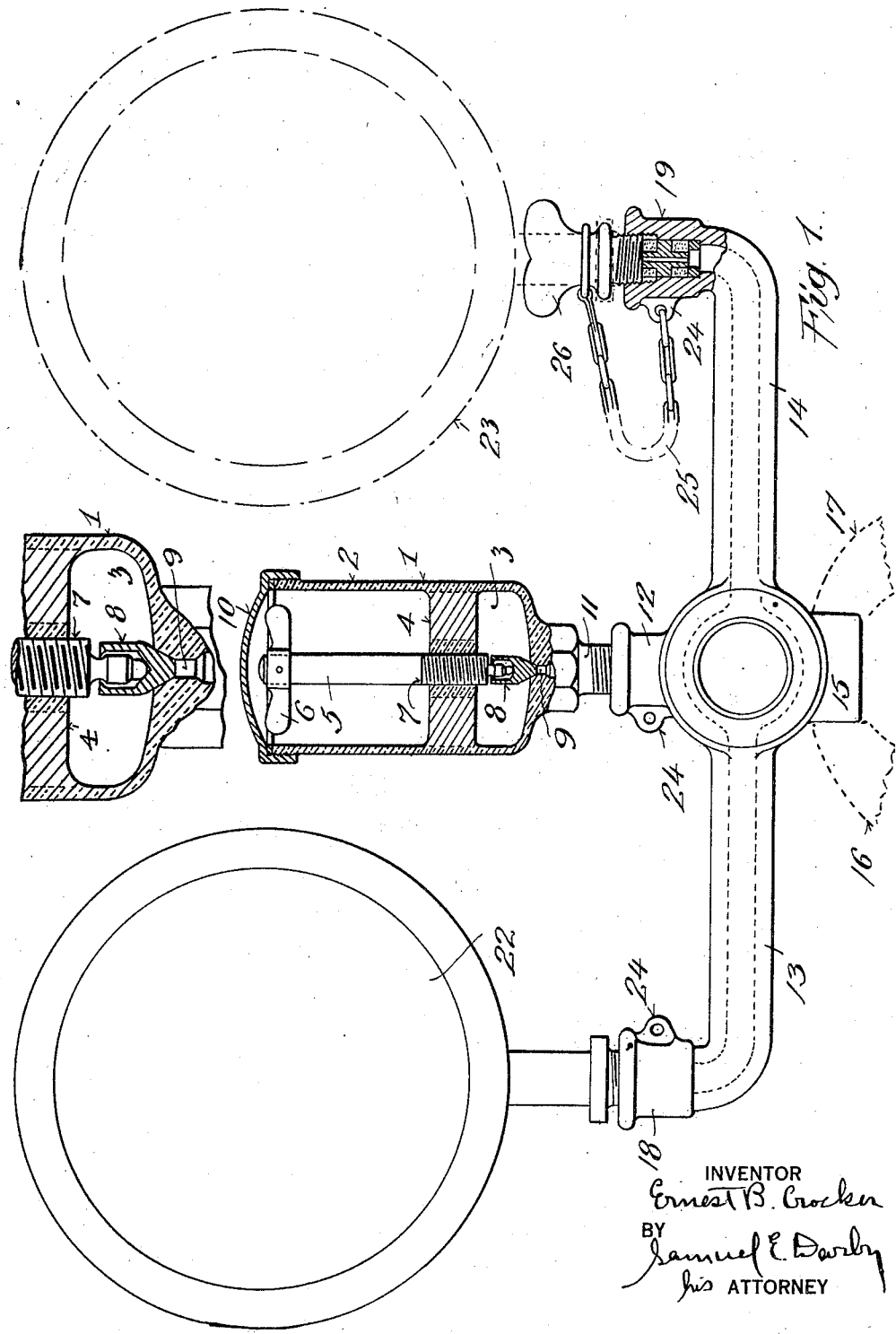
Fig. 1 is a view in front elevation of a testing apparatus embodying my invention.

It is among the special purposes of my present invention to provide a portable testing apparatus for testing the correct reading of gauges or similar devices by means of comparison with the readings thereon of a standard gauge or similar devices forming part of the equipment. In accordance with my invention I propose to employ a fluid, preferably oil, for the purpose of transmitting pressure to the respective gauges, and to transmit equal pressure to both of the devices to be tested. In test gauges of this nature difficulty has heretofore been encountered in providing a convenient device for ready transportation from place to place, and in accordance with my present invention I provide a device which permits disassembly of such parts as the fluid reservoir and master or standard gauge, which make the assembly difficult of packing for transportation, and in addition thereto, I provide means for rendering the disassembled parts fluid proof to prevent leakage during transportation. While I have shown and will describe my invention as applied to gauges of the pressure type I wish it to be understood that I do not desire to be limited or restricted in this respect as the invention may be employed in connection with checking up pressure readings on any device.

In accordance with my invention I employ a fluid cylinder 1, which is formed with a chamber 3 therein. A web 4 is also located in said chamber and carried by said cylinder, through which web a stem 5 is adapted to pass, controlled by a suitable handle 6, preferably located within the chamber 2, which handle, by means of cooperating threads 7 on the stem 5, and in the partition 4, seats and unseats the valve 8 carried by the inner end of the stem 5 with respect to the port 9 located in the bottom of the cylinder 1. The valve 8 is carried by the end of the stem 5, for swivel movement relative thereto by means of the projection of the top edge of the valve being bent inwardly to lie in the circumferential groove in the stem, as clearly shown in Fig. 1. By this arrangement, no cutting action takes place when the valve is securely seated on its seat. A cap 10 is provided for the top or open end of the cylinder 1 to form a fluid tight chamber and to prevent dust, dirt, or the like, from accumulating in the chamber 2, to likewise prevent the handle 6, and consequently the stem 5 from being rotated by accident or otherwise when the device is not in use to thereby prevent the valve 8 from unseating in the casting or cylinder 1, and further to prevent leakage of the oil when the needle valve is closed for transportation purposes. By this construction I am enabled to do away with the necessity of a packing gland and nut around the stem which would be necessitated if the stem came through the cap. Oil, or other suitable fluid, is contained in the cylinder 3, and is allowed to pass out thereof through the port 9 to the balance of the apparatus to be hereinafter described according to the opening and closing of the valve 8. The chamber 3 and port 9 is in communication in any suitable manner, for example, by means of adapter 11 with a neck 12 of arms 13 and 14, see Figs. 1 and 2, which arms are in communication with each other and with port 9 of the oil case 1 and with the pump. Formed as a part of the casting which constitutes the arms 13 and 14 and the neck 12 is a projection or lug 15 to form convenient means for rigidly supporting the apparatus in any suitable manner, for example, between the jaws 16 and 17 of a vice. The arms 13 and 14 are each provided with necks 18 and 19 respectively, interiorly threaded to form sockets to receive therein the standard gauge 22, and the gauge 23 to be tested. Where the gauges are provided with nipples of a size differing from the size of the sockets in the ends of the arms 13 and 14, suitable adapters such as are illustrated in Fig. 5 may be employed in the usual manner to connect the gauge with its arm. It is immaterial to which neck 18 or 19 the standard gauge is connected and to which the gauge to be tested is connected. The respective necks 18, 12, and 19, are provided with eye lugs 24, to each of which is secured one end of a chain 25, the other end of which is secured to a suitable plug 26 adapted to screw into the respective necks when the device is disassembled to prevent the oil or other fluid from escaping when being carried or otherwise transported. Secured to and communicating with the arms 13 and 14 at right angles relative to the fluid cylinder 1 is a pump chamber 30. The pump chamber is indicated at 32 and communicates with the casting forming the arms 13 and 14 through a port 33 extending through the neck 34 of the pump chamber casting. The pump cylinder 35 is screwed into the pump cylinder casting 36 and is provided at its top with a threaded nut 37, through which is threaded the piston rod 38 provided with any suitable or well known piston indicated at 39 at its lower end. The piston chamber 35 and the nut 37 are screwed into joining block or cap 40. The piston rod 38 and piston 39 are moved into and out of the piston chamber 35 in any suitable manner, for example, by means of handle 41 bolted or otherwise secured to the outer end of the piston rod 38. The adapters employed in connecting the various parts illustrated in Fig. 5 may be of any suitable or desired construction, but I have shown the same employing packing indicated at 50 to render the same oil-tight or water-tight. The operation of the device will be apparent. Assuming that the testing apparatus has been carried to the place where the test is desired to be made, the apparatus is set up; that is, the casting forming the arms 13 and 14 is secured in any suitable manner, as for example, in the manner illustrated, and the plugs 26 are removed from the respective necks 18, 12, 19, and the standard gauge, either 21 or 22, is inserted in the one neck, and the device to be tested, either 23 or 22, is inserted in the other neck. The oil cylinder 1 having been removed for the purpose of transportation, the plug of the neck 12 is taken out when the device is being assembled and the oil chamber 1 inserted therein. The fluid employed for the purpose of the test is contained in the arms 13, 14, and may be replenished from the chamber 3 by withdrawing the valve 8 from its valve seat therein, and allowing a sufficient amount of the oil to enter into the casting forming the arms 13 and 14. The valve 8 is then seated on its seat, and the piston rod 38 and its piston 39 is forced downwardly in the piston cylinder, thus exerting a pressure on the oil and causing readings in the two gauges 22 and 23. The comparison between the two gauges, it being remembered that one of the gauges is a standard tested gauge, will give the required check-up on the readings of the gauge to be tested, the pressure, of course, being regulated by means of the handle 41 controlling the piston rod 38, as will be readily understood to those skilled in the art.

Many modifications and changes in detail will occur to those skilled in the art without departing from the spirit and scope of my invention as defined in the claims. Therefore while I have shown and described one structure embodying the principles of my invention I wish it to be understood that this specific structure was selected for illustrative purposes only and is not to be regarded in a limiting sense. Having now set forth the objects and nature of my invention and what I claim as new and useful and of my own invention and desire to secure by Letters Patent is,—

1. In a knock-down portable testing device of the character described, and in combination with a standard gauge and the device to be tested, of a member provided with two hollow arms in communication with each other, and adapted to detachably receive in their respective ends said standard gauge and the device to be tested, means for maintaining a supply of fluid in said member, and detachable means for replenishing said supply, and means for exerting a pressure on said fluid.

2. In a knock-down portable testing device of the character described, and in combination with a standard gauge and the device to be tested, of a permanently fluid filled member provided with two hollow arms in communication with each other, and adapted to detachably receive in their respective ends said standard gauge and the device to be tested, detachable means for supplying a fluid to said member, and means carried by said member, and in communication with said hollow arms for supplying pressure to said fluid.

3. In knock-down portable testing device of the character described, and in combination with a standard gauge and the device to be tested, of a permanently fluid filled member provided with two hollow arms in communication with each other and adapted to detachably receive in their respective ends said standard gauge and the device to be tested, detachable means for supplying fluid to said member to compensate for evaporation, and means carried by said member, and in communication with said hollow arms for supplying pressure to said fluid, and detachable fluid-tight plugs for the openings in said member when the parts detachable therefrom are removed for retaining the fluid in said chamber during transportation.

4. In a knock-down portable testing device of the character described, and in combination with a standard gauge and the device to be tested, of a member provided with means to detachably receive the standard gauge and the device to be tested and place the same into communication with each other, said member being maintained filled with fluid, and means for maintaining the openings in said member fluid-tight when said detachable parts are removed therefrom to prevent leakage of said fluid during transportation.

5. In a knock-down portable testing device of the character described, and in combination with a standard gauge and the device to be tested, of a member provided with means to detachably receive the standard gauge and the device to be tested and place the same into communication with each other, a fluid reservoir detachably carried by said member and communicating with said gauge and the device to be tested, means for controlling the supply of oil from said reservoir to said member, said means serving to render said reservoir fluid-tight when the same is detached from said member to facilitate transportation of the disassembled device.

6. In a knock-down portable testing device of the character described, and in combination with a standard gauge and the device to be tested, of a member provided with means to detachably receive the standard gauge and the device to be tested and place the same into communication with each other, a fluid reservoir detachably carried by said member and communicating with said gauge and the device to be tested, a valve for controlling the supply of fluid from said reservoir to said member, said valve serving to render said reservoir fluid-tight when the same is detached from said reservoir to facilitate transportation of the disassembled device.

7. In a knock-down portable testing device of the character described, and in combination with a standard gauge and the device to be tested, of a member provided with means to detachably receive the standard gauge and the device to be tested and place the same into communication with each other, a fluid reservoir detachably carried by said member and communicating with said gauge and the device to be tested, a valve for controlling the supply of fluid from said reservoir to said member, said valve serving to render said reservoir fluid-tight when the same is detached from said reservoir and means located within said reservoir for controlling said valve.

8. In a knock-down portable gauge testing device, a member provided with means to detachably receive a standard gauge, and a device to be tested and place the same in communication with each other, said member being maintained filled with fluid, and means for maintaining the openings in said member fluid tight when said detachable parts are removed therefrom to prevent leakage of said fluid during transportation, and fluid-tight detachable means for supplying fluid to said member to compensate for accidental leakage, evaporation, or the like.

9. In a knock-down portable test device, a member adapted to be filled with liquid provided with means detachable to receive a standard gauge and the gauge to be tested, and means for adjustably subjecting said fluid to pressure, detachable means for supplying fluid to said member to compensate for accidental leakage or evaporation of the fluid, and means for retaining said fluid in said member when said gauges and detachable means are detached whereby said device may be transported in condition for use.

In testimony whereof I have hereunto set my hand on this first day of August A. D. 1919.

ERNEST B. CROCKER.